United States Patent [19]

Koester

[11] 4,092,063
[45] May 30, 1978

[54] FILMSTRIP PROJECTOR

[75] Inventor: Richard H. Koester, Rochester, N.Y.

[73] Assignee: The Singer Company, New York, N.Y.

[21] Appl. No.: 724,881

[22] Filed: Sep. 20, 1976

[51] Int. Cl.² .................... G02B 7/02; G03B 21/22; G03B 3/00
[52] U.S. Cl. ........................... 353/71; 350/254; 350/255; 353/101
[58] Field of Search .................. 353/71, 72, 101; 352/140; 350/255, 254

[56] References Cited

U.S. PATENT DOCUMENTS

| 2,435,300 | 2/1948 | Weiskopf | 240/2 |
| 2,484,972 | 10/1949 | Turrettini | 353/101 |
| 3,447,869 | 6/1969 | Szymber | 353/71 |
| 3,809,460 | 5/1974 | Lettan et al. | 350/254 |
| 4,030,821 | 6/1977 | Badalich | 353/71 |

Primary Examiner—Steven L. Stephan
Attorney, Agent, or Firm—Charles R. Lewis

[57] ABSTRACT

Projector elements for a film projector selectively project an image onto a local viewing screen mounted on the projector housing or to a viewing screen remotely located from the projector. A projector mounted control is coupled to a reflecting mirror pivotable about a vertical axis and to position shiftable objective and condensing lenses to permit convenient single control shifting of the mirror and the lenses for either local screen viewing or remote screen viewing.

10 Claims, 6 Drawing Figures

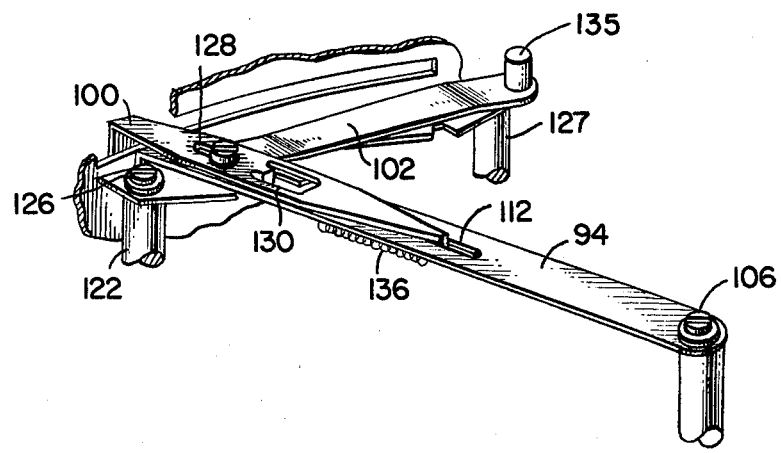
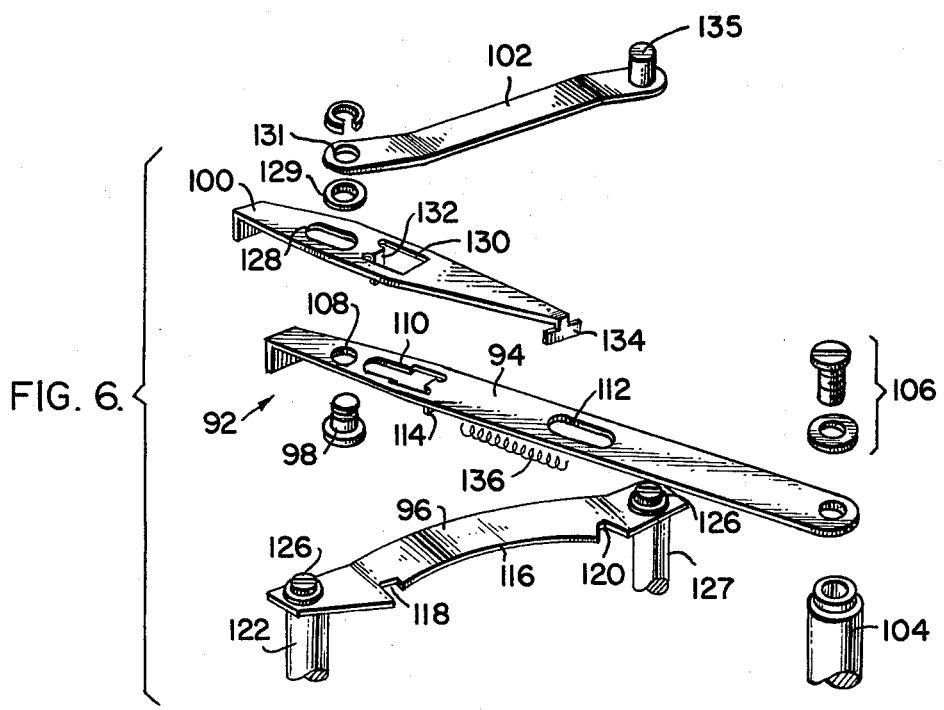

FILMSTRIP PROJECTOR

BACKGROUND OF THE INVENTION

1. Field of the Invention

The present invention relates to film projector elements for selective projection of an image onto a viewing screen mounted on a projector housing or a viewing screen remotely located from the projector.

2. Description of the Prior Art

Film projectors have found wide spread use in the home entertainment, business, and education fields. Projectors may take the form of motion picture, slide, or filmstrip projectors.

A first species of projector is adapted to project an image on a viewing screen remotely located from the projector. Projectors of this species are particularly suited for visual presentation to large audiences. A second species of projector is adapted to project an image onto a viewing screen, defined herein as a local viewing screen, mounted on the projector. Projectors of this second species are suited for visual presentations to small audiences and are particularly suited for visual presentations to one person.

Projectors of both species may be combined with audio reproduction means, such as magnetic tape playback devices, to provide a combined audio-visual presentation.

Projectors which utilize a filmstrip or slides to sequentially present filmstrip frames or slides may be combined with automatic advancing means which advance a filmstrip frame or slide in response to cueing signals recorded on magnetic tape. Such machines are ideally suited for individual programmed instruction.

There is a need for a projector which combines the desirable features of the remote screen and the local screen projector, viz., a projector capable of selective projection of an image onto a viewing screen mounted on the projector housing or a viewing screen remotely located from the projector. As is apparent, such a projector could be utilized for individual or large audience presentations. Prior art projectors capable of selective local viewing screen or remote viewing screen projection have employed various projector elements, such as, a mirror or mirrors to reflect the image onto the local viewing screen, and plural objective lenses.

One such prior art projector described in U.S. Pat. No. 3,447,869 to Szymber provides selective projection to a remotely located viewing screen or a local viewing screen mounted on the projector cabinet. This projector utilizes a cam plate coupled to a pivotable control lever. The cam plate includes a plurality of cam tracks coupled to the projector mirror and to a lens carrier carrying a local viewing screen objective lens and a remote viewing screen objective lens. When the control lever is actuated to a first position the projector mirror and lens carrier are lifted to provide remote screen projection. When the control lever is actuated to a second position the projector mirror and lens carrier are lowered to provide local screen viewing. The control lever actuation force for actuation to the first position is larger than the actuation force for actuation to the second position. In order to minimize the control lever actuation force for actuation to the first position, it is necessary that the projector mirror and lens carrier be of light weight construction.

The projector described in U.S. Pat. No. 3,447,869 utilizes a single condensing lens in association with both the local viewing screen projector lens and the remote viewing screen objective lens. While the single condensing lens may provide adequate illumination efficiency for both the local viewing screen objective lens and the remote viewing screen objective lens, it can not provide optimum efficiency for both lenses.

The present invention seeks to provide projector elements for a film projector which overcome the disadvantages of the prior art. Projector elements are provided in which screen selection is achieved with a single movement control lever to cause displacement of the projector elements with a minimum of lifting of the projector elements. The control lever actuation force is kept to a minimum, and the actuation forces are substantially equal for actuation of the lever in a first direction or a second direction. The present invention also seeks to overcome the disadvantages of the prior art by providing a projector having separate condensing lenses associated with each objective lens to achieve optimum illumination efficiency for both local screen viewing and remote screen viewing.

SUMMARY OF THE INVENTION

Projector elements for image projection means enable selective projection of an image in a first direction to a viewing screen remotely located from the projector or in a second direction to a viewing screen mounted on the projector means. A mirror moveable to a first mirror position and to a second mirror position is mounted on a support means. A rotatably mounted shaft is rotatable to a first shaft position and a second shaft position. A linkage couples the mirror to the shaft such that movement of the mirror to the first mirror position causes rotation of the shaft to the first shaft position, and movement of the mirror to the second mirror position causes rotation of the shaft to the second shaft position. The shaft carries a lens carrier thereon for rotation with the shaft. The lens carrier carries a first objective lens in alignment with a first condensing lens, and a second objective lens in alignment with a second condensing lens. When the mirror and the shaft are in their respective first positions, the first objective lens and the first condensing lens are placed along the image axis and the mirror is placed in the image axis to reflect the image along the second direction to the local viewing screen. When the mirror and the shaft are in their respective second positions, the second objective lens and the second condensing lens are placed in the image axis to project the image along the first direction onto the remotely located viewing screen.

BRIEF DESCRIPTION OF THE DRAWINGS

The present invention will be fully understood from consideration of the following detailed description taken in conjunction with the accompanying drawings, in which like reference characters refer to like parts in the several views, and wherein FIG. 5 is a perspective view of a mirror switching mechanism, and FIG. 6 is an exploded perspective view of the mirror switch mechanism shown in FIG. 5.

DESCRIPTION OF A PREFERRED EMBODIMENT

Figure 1:
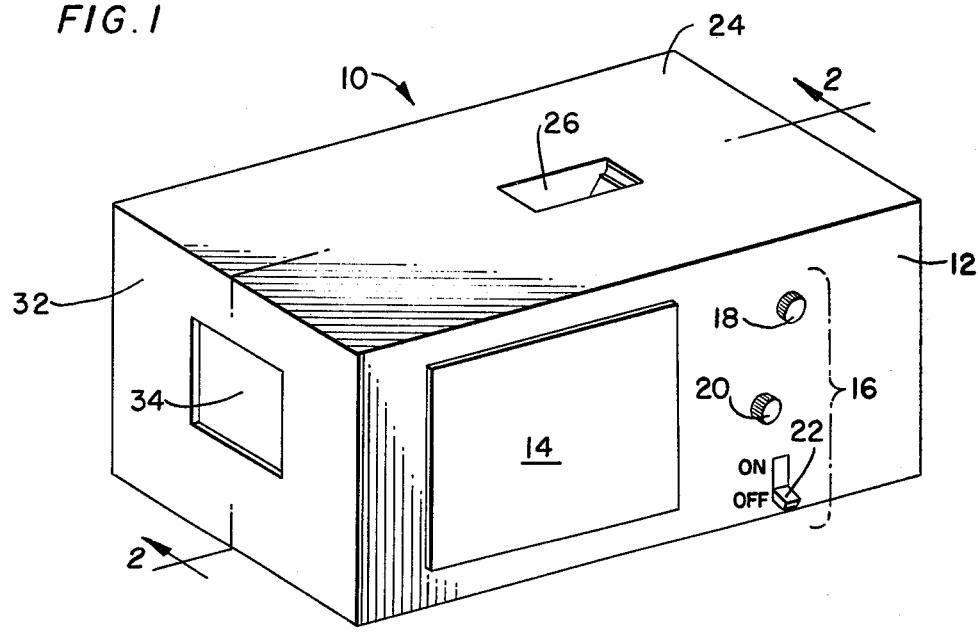
FIG. 1 is a perspective view of a filmstrip projector utilizing the present invention.

As shown in the accompanying drawings, the present invention may be incorporated into a filmstrip projector located within a housing generally designated by the reference charactor 10. The projector includes a front panel 12 having a viewing screen 14, designated herein as the local viewing screen, mounted thereon. Projector controls 16 are located to the right of the screen 14. The screen 14 is formed from translucent material and is the type designed to be illuminated from the interior of the projector housing 10. The controls 16 include a filmstrip advance control 18, a focus control 20, and a projector on-off switch 22. The controls 16 shown are the minimum essential for an understanding of the present invention. The projector may be combined with a power filmstrip advance means, magnetic tape audio accompaniment, the automatic filmstrip advance means actuated by cueing signals recorded on magnetic tape.

A top panel 24 includes an opening formed therein which provides access to a cavity 26 adapted to receive a filmstrip cartridge 28. The cartridge 28 has the external configuration shown in FIG. 2 and contains a coiled strip of photographic film 30. The filmstrip 30 includes a plurality of sequentially arranged perforations along both edges in a manner well known to those skilled in the art. The film 30 is guided along a predetermined path in the cartridge 28 to a film exit opening formed on one side of the cartridge 28.

A side panel 32 of the projector housing 10 has a opening 34 formed therein to permit projecting a image onto a viewing screen (not shown) remotely located from the projector. A transparent glass plate (not shown) is mounted at the opening 34 to prevent dust or other foreign matter from entering the projector. While not illustrated, a moveable shutter is provided to cover the opening 34 when the projector is not in use for remote screen viewing to protect the transparent glass plate.

Figure 2:
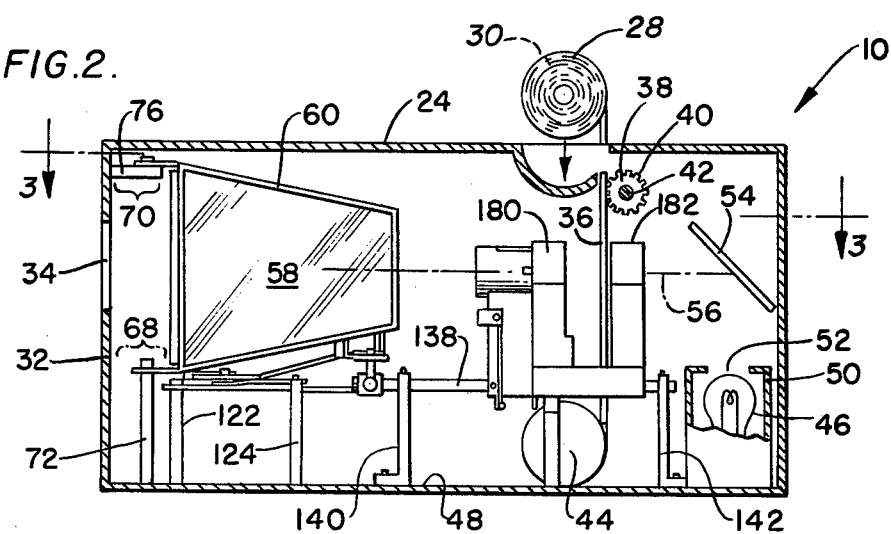
FIG. 2 is a front elevation cross section view of the projector shown in FIG. 1 taken along line 2—2.
Figure 3:
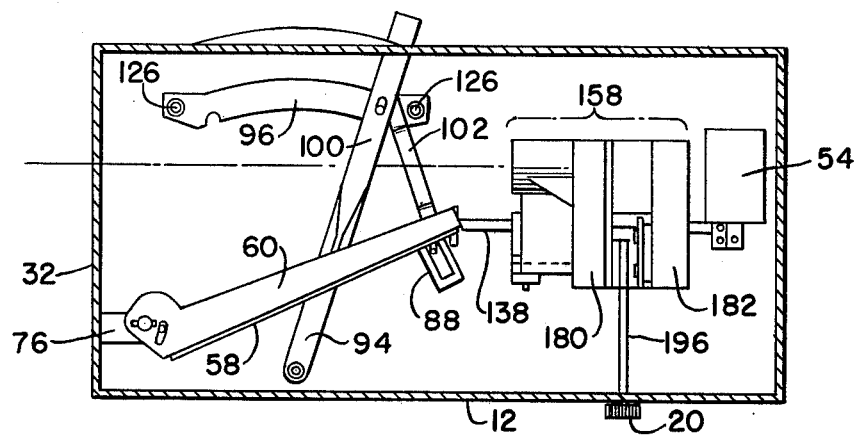
FIG. 3 is a top cross section view of the projector shown in FIG. 1 and FIG. 2 taken along line 3—3.

The internal parts of the projector are illustrated in FIGS. 2 and 3 with selected parts not essential to an understanding of the present invention omitted or shown in simplified form for reasons of clarity.

When the cartridge 28 is inserted into the cavity 26, the leading edge of the film 30 is guided into engagement with a vertically aligned film track 36. The film track 36 constitutes a guide means to maintain the film 30 in proper relationship with the other projector structure during projection. The film track 36 has an aperture 184 (FIG. 4) formed therein such that light from the projector illumination source described below passes thru the film 30 disposed in the aperture to form an image for projection.

A film 30 engaging sprocket 38 having a plurality of uniformly spaced radially extending pins 40 is located adjacent the film track 36. The sprocket 38 is secured to a shaft 42 which passes thru the front panel 12 and terminates with the film advance control 18. As the leading edge of the film 30 is guided down the film track 36, the sprocket 38 pins 40 engage the film 30 perforations. Rotation of the film advance control 18 in a first direction causes the film 30 to advance past the aperture toward the lower end of the film track 36. Rotation of the film advance control 18 in a second direction causes the film 30 to retract into the cartridge 28. The lower end of the film track 36 communicates with a chamber 44 which accumulates the film 30 as it is advanced.

The projector illumination source is a lamp 46 mounted in a socket or holder 50 secured to both the projector side and the base 48. The holder 50 has a opening 52 formed therein. A mirror 54 is mounted above the opening 52 to reflect a portion of the light from the lamp 46 along an image axis 56 thru the aperture formed in the film track 36 and the optical elements of the projector described below. Electrical power is provided to the lamp 46 by means of an electrical circuit (not shown) in cooperation with on-off switch 22.

Figure 4:
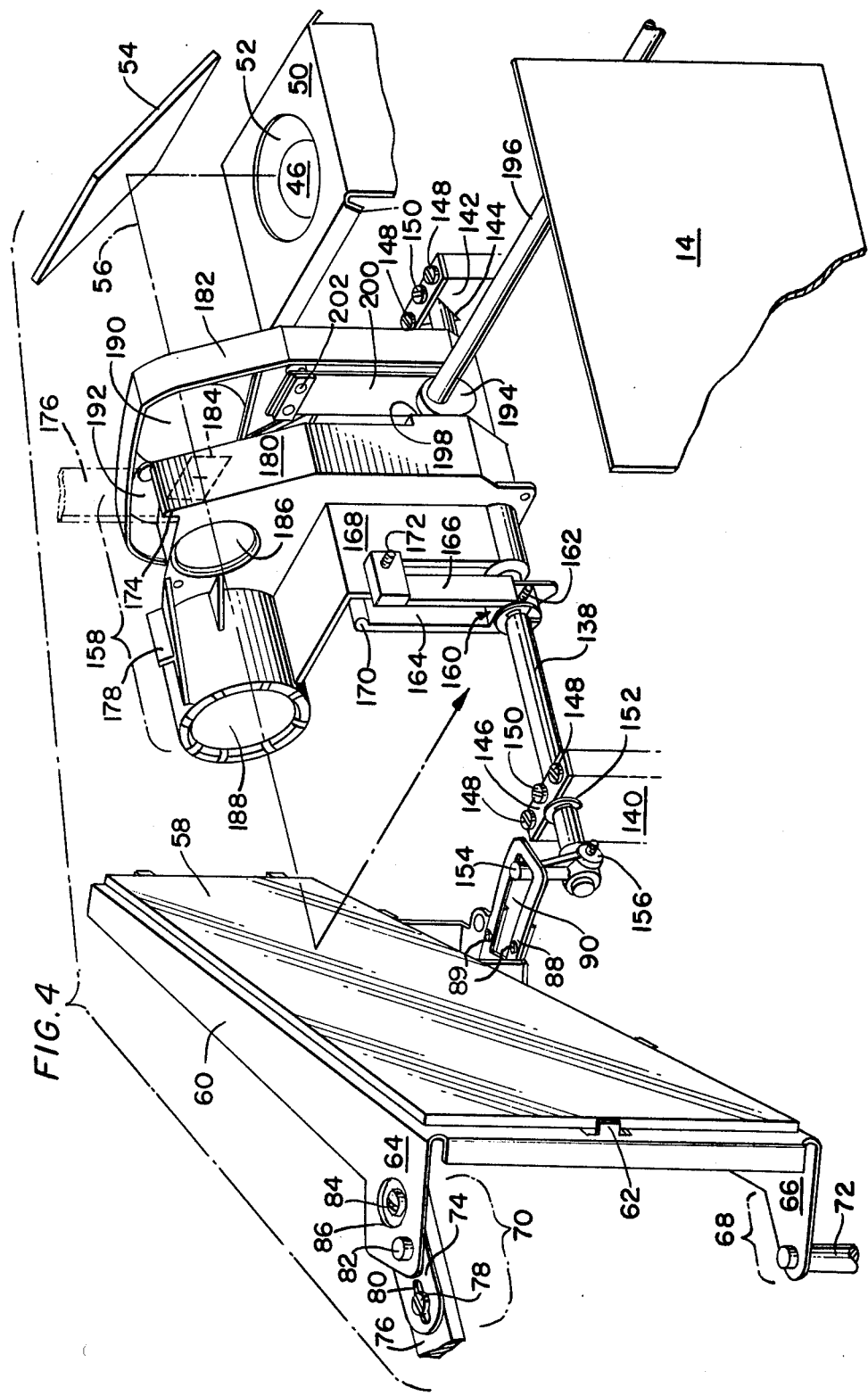
FIG. 4 is a partial perspective view of the projector elements shown in FIG. 2 and FIG. 3 with selected structure omitted or shown in simplified form for reasons of clarity.

Referring now to FIG. 4 for further details of the present invention shown in FIG. 2 and FIG. 3, a mirror 58 is adhesively secured to a mirror support frame 60. Tabs 62, which extend outward from the frame 60, serve to positionally located the mirror on the frame 60. One edge of the frame 60 has an upper extension 64 and a lower extension 66 which extend laterally outward to support the frame 60 on a lower pivot 68 and an adjustable upper pivot 70. The lower pivot 68 includes a vertically aligned support shaft 72 secured to and extending upwardly from the base 48. The upper end of the support shaft 72 has a reduced diameter portion which extends thru a clearance hole formed in the lower extension 66 to allow relative rotation between the frame 60 and the support shaft 72. The adjustable upper pivot 70 includes a bearing plate 74 fastened to a support bracket 76 by means of a threaded fastener 78 passing thru a slot 80 formed in the bearing plate 74. The bearing plate 74 includes a stub shaft 82 passing thru a clearance hole in the upper frame extension 64 to allow relative rotation between the stub shaft 82 and the frame 60. A second threaded fastener 84 passes thru a clearance hole 86 formed in the upper extension 64 and thru a clearance hole (not shown) formed in the bearing plate 74. The mirror 58 can be adjusted relative the other projector parts described below by varying the position of the threaded fastener 78 in the slot 80 and the position of the threaded fastener 84 in its clearance hole (not shown).

The mirror support frame 60 can rotate about a substantially vertical axis defined by the lower pivot 68 and the upper pivot 70 between a first position and a second position. The position of the mirror support frame 60 shown in FIG. 4 is designated the first mirror 58 position. In the first position the mirror 58 is rotated counterclockwise (when viewed from above as shown in FIG. 3) toward the rear of the projector. The mirror 58 will intercept any images transmitted along the image axis 56 and reflect the images in a second direction to the viewing screen 14. The position of the mirror support frame 60 shown in FIG. 3 is designated the second mirror 58 position. In the second position the mirror 58 rotated clockwise (when viewed from above) toward the front of the projector. The mirror 58 is rotated out of the image axis 56 and any images transmitted along the image axis will pass through opening 34 to the remotely located viewing screen (not shown).

The torque required to rotate the mirror support frame 60 between its first position and its second position arises from friction generated by the upper pivot 70 and the lower pivot 68. The torque is substantially the same for mirror support frame 60 rotation in either direction. In that the mirror 58 is not elevated as it changes position, the present invention overcomes a disadvantage of prior art projectors which require a lifting displacement of the mirror when changing mirror positions.

A lost motion link 88 extends arcuately outward from the lower edge of the mirror support frame 60 and includes an arcuate slot 90 formed therein. The link 88 couples the mirror support frame 60 with other parts of the projector described below. The link 88 is secured to the lower edge of the mirror support frame 60 by a plurality of threaded fasteners 89, each of which passes thru clearance slots (not shown) to engage threaded holes in the mirror support frame 60. The position of the link 88 relative to the other projector structure may be varied by adjusting the position of the threaded fasteners 89 in their respective slots.

The mirror support frame 60 is moved between its first position and its second position by means of a switch mechanism 92 shown in perspective in FIG. 5 and in exploded perspective in FIG. 6. The mechanism 92 includes a lever 94, a guide plate 96, a flanged coupling stud 98, a control member 100, and a coupling link 102.

The lever 94 is pivoted at one end on a vertically aligned support shaft 104 which is secured to and extends upwardly from the projector base 48. The upper end of the support shaft 104 has a reduced diameter portion which passes thru a clearance hole in the lever 94 to allow relative rotation between the lever 94 and the support shaft 104. Fastening means 106 constrain the lever 94 to the support shaft 104. The lever 94 has a hole 108, a cutout 110, and a slot 112 formed therein. The hole 108 is located near the distal end of the lever 94, the cutout 110 is formed adjacent the hole 108, and the slot 112 is formed intermediate the pivoted end of the lever 94 and the cutout 110. A tab 114 projects downward from an edge of the cutout 110.

The horizontally disposed guide plate 96 provides support for the distal end of the lever 94. The guide plate 96 includes a guide track 116 along one edge and detent notches 118 and 120 at each end of the guide track 116. Vertically aligned supports 122 and 124 in combination with fastening means 126 secure the guide plate 96 to the base 48.

The control member 100 is mounted on a lever 94 for reciprocation along the longitudinal axis of the lever 94. The control member 100 has a longitudinal slot 128 and a cutout 130 formed therein. A tab 132 projects downward from an edge of the cutout 130. An inverted "T" lug 134 projects downward from one end of the control member 100. When the control member 100 is assembled to the lever 94 as in FIG. 5 the slot 128 of the control member 100 is in registration with the hole 108 of the lever 94, the depending tab 132 projects thru the cutout 110, and the inverted "T" lug 134 passes thru the slot 112. One end of a tensioned spring 136 is secured to the tab 114 on the lever 94 and the other end of the spring 136 is secured to the depending tab 134. The spring 136 urges the control member 100 along the longitudinal axis toward the distal end of the lever 94.

The shank portion of the coupling stud 98 passes thru the clearance hole 108 in the lever 94, the slot 128 in the control member 100, a spacer washer 129, and a clearance hole 131 in one end of the coupling link 102. The stud 98 extends out from the top side of the control member 100 and is held in place by suitable fastening means such as spring clip 133.

When the lever 94 is at either limit of its rotation, the tab 132 is forced into a notch 118 or 120 by the spring 136 to lock the lever 94 in either its first or second position. Pushing the control member 100 along the longitudinal axis of the lever 94 causes the tab 132 to move out of the notch 118 or 120 and allows the lever 94 to be rotated toward the other notch.

The coupling link 102 connects the switch mechanism 92 with the mirror support frame 60. One end of the link 102 is coupled to the coupling stud 98 as described above. A stub shaft 135 is secured to and extends upwardly from the other end of the link 102. The stub shaft 135 passes through a clearance hole in the adjustable lost motion link 88 which in turn is connected to the mirror support frame 60.

To switch the mirror 58 from its first position shown in FIG. 4 to its second position shown in FIG. 3, the control member 100 is pushed toward the proximal end of the lever 94. The control member 94 pushes the tab 132 out of the notch 118 to unlock the lever 94. The lever 94 is then rotated clockwise (when viewed from above as in FIG. 3) across the guide plate 96 until the tab 132 enters the notch 120. As the lever 94 is moved to the right, the coupling link 102 causes the mirror support frame 60 to rotate clockwise (when viewed from above) to the second mirror 58 position.

To switch the mirror 58 from its second position shown in FIG. 3 to its first position shown in FIG. 4, the control member 100 is pushed toward the proximal end of the lever 94. The control member 100 pushes the tab 132 out of the notch 120 to unlock the lever 94. The lever 94 is then rotated counterclockwise (when viewed from above) across the guide plate until the tab 132 enters the notch 118. As the lever 94 is moved to the left, the coupling link 102 causes the mirror support frame to rotate counterclockwise (when viewed from above) to the first mirror 58 position.

A lens carrier shaft 138 shown in FIG. 4 is mounted for rotation upon supports 140 and 142 which are secured to the base 48. A "V" notch 144 (shown in support 142 only) is formed in the top of each support 140 and 142 to receive the shaft 138. A retainer strap 146, fastened to each support by threaded fasteners 148, spans each notch 144 to restrain the shaft 138 in the notch 144. An adjustment screw 150 passes thru a threaded hole in the strap 146 to provide an adjustable means to limit the radial movement of the shaft 138. To prevent marring of the surface of the shaft 138, the adjustment screw 150 may be tipped with nylon or other suitable plastic. Axial translation of the shaft 138 is prevented by circumferential "C" clips 152 disposed in peripheral grooves (not shown) located adjacent the outer sides of the supports 140 and 142.

The end of the shaft 138 nearest the mirror support frame 60 has a radially extending arm 154 secured by set screw 156 to the shaft 138 for rotation therewith. The arm 154 may be secured to the shaft by other suitable means including a roll pin. The distal portion of the arm 154 extends thru the slot 90 in the lost motion link 88 described above. The arm 154 in combination with the link 88 constitutes a coupling means between the mirror 88 and the shaft 138.

Rotation of the mirror support frame 60 to the first mirror 58 position causes the shaft 138 to rotate to a first shaft position. As the mirror support frame 60 begins rotating toward the first mirror 58 position, the arm 154 and the shaft 138 remain stationary. As the mirror support frame 60 nears the first mirror 58 position an end of the link 88 engages the distal portion of the arm 154 to cause the shaft 138 to rotate to the first shaft position.

Rotation of the mirror support frame 60 to the second mirror 58 position causes the shaft 138 to rotate to a second shaft position. As the mirror support frame 60 begins rotating toward the second mirror 58 position, the arm 154 and the shaft 138 remain stationary. As the mirror support frame 60 nears the second mirror 58 position the other end of the link 88 engages the distal portion of the arm 154 to cause the shaft 138 to rotate to the second shaft position.

A unitary lens carrier, generally designated by the reference character 158, is mounted on the shaft 138. The lens carrier 158 may be formed from any suitable material, such as a rigid plastic. The shaft 138 extends thru a clearance bore in the lens carrier 158 such that the lens carrier 158 is free to rotate relative to the shaft 138 and translate axially along the shaft 138.

A fork element 160 causes the lens carrier 158 to rotate with the shaft 138. The fork 160 element is secured to the shaft 138 by a set screw 162 for rotation therewith and is bifurcated to form two parallel spaced apart tines 164 and 166. The fork 160 element may be secured to the shaft by other suitable means including a roll pin. Each tine embraces a side of a depending web 168 integrally formed with the lens carrier 158. A contacting pad 170 is formed at the distal end of the tine 164, and an adjusting screw 172 extends thru a threaded hole near the distal end of the tine 166.

When the mirror support frame 60 is rotated to its first position shown in FIG. 4 the shaft 138 is caused to rotate to the first shaft 138 position thereby causing the fork 160 secured to the shaft 138 to rotate. The adjusting screw 172 passing thru tine 166 contacts the web 168 and causes the lens carrier 158 to rotate to a first lens carrier 158 position as shown in FIG. 4. A lens carrier stop 176 (shown in phantom in FIG. 4) is utilized to arrest the motion of the lens carrier 158 at the first lens carrier position. The stop 176 is secured to and depends from projector structure (not shown) and co-operates with an abutment 174 integrally formed with the lens carrier 158 to establish the first lens carrier position.

When the mirror support frame 60 is rotated to its second position as shown in FIG. 3 the shaft 138 is caused to rotate to the second shaft 138 position thereby causing the fork 160 secured to the shaft 138 to rotate. The pad 170 at the distal end of tine 164 contacts the lens carrier 158 web 168 and causes the lens carrier 158 to rotate toward a second lens carrier 158 position as shown in FIG. 3. The lens carrier stop 176 co-operates with another abutment 178, also integrally formed with the lens carrier 158, to establish the second position of the lens carrier 158. The lens carrier 158 to stop 176 relationship may be adjusted by varying the position of the lost motion link 88 securing screws 89. The torque required to rotate the lens carrier 158 arises from the shaft 138 bearing friction and the moment created by the mass of the lens carrier 138. The torque is substantially the same for lens carrier 138 rotation in either direction.

The unitary lens carrier 158 includes an objective lens mount 180 and a condensing lens mount 182 spaced apart from the objective lens mount 180. The film track 36, described above, is disposed in the space between the objective lens mount 180 and the condensing lens mount 182. The film track 36 is not shown in FIG. 4 for reasons of clarity. The position of the aperture is represented by dashed line 184. A first objective lens 186 and a second objective lens 188 are located in the objective lens mount 180 in a angularly spaced relation. The first objective lens 186 and the second objective lens 188 are located in different spaced planes to properly focus the image at the required distances. A first condensing lens 190 and a second condensing lens 192 are located in the condensing lens mount 182 in an angularly spaced relation. The first condensing lens 190 is specifically adapted to provide optimum illumination efficiency when combined with the first objective lens 186. Likewise, the second condensing lens 192 is specifically adapted to provide optimum illumination efficiency when combined with the second objective lens 188. The first objective lens 186 and the first condensing lens 190 are so mounted in the lens carrier 158 that the optical axes of these two lenses are coincident. Likewise, the second objective lens 188 and the second condensing lens 192 are so mounted in the lens carrier 158 that the optical axes (not shown) of these two lenses are coincident. The first set of lenses, 186 and 190, is specifically adapted for local screen 14 projection. The second set of lenses, 188 and 192, is specifically adapted for remote screen viewing. By utilizing separate condensing lenses specifically adapted for remote or local screen viewing and mounting these condensing lenses on the same focusable lens carrier as the objective lenses, it is possible to achieve increased projection efficiency over those prior art projectors which utilize a single non-focusable condensing lens for both remote and local screen viewing.

Placing the mirror support frame 60 in the first mirror 58 position by means of the switch mechanism 92 causes the link 88 and the arm 154 to rotate the shaft 138 to the first shaft 138 position to place the mirror 58, the first objective lens 186, and the first condensing 190 in the projector image axis 56. Light from the projector lamp 46 is reflected by the mirror 54 along the image axis 56 thru the first condensing lens 190, thru the film 30 located in the aperture 184, and thru the first objective lens 186. The light falling on mirror 58 is reflected in a second direction to the local viewing screen 14.

Placing the mirror support frame 60 in the second mirror 58 position by means of the switch mechanism 92 causes the link 88 and the arm 154 to rotate the shaft 138 to the second shaft 138 position to place the mirror 58 out of the image axis 56, and the second objective lens 188 and the second condensing lens 192 in the projector image axis 56. Light from the projector lamp 46 is reflected by the mirror 54 thru the second condensing lens 192, the film 30 located in the aperture 184, thru the second objective lens 188, and thru the projection opening 34 onto a remotely located viewing screen (not shown).

The light projected onto either the local viewing screen 14 or the remote viewing screen is focused by adjusting the axial position of the lens carrier 158 along the longitudinal axis of the shaft 138. In order to permit such axial adjustment, clearance is provided between the adjusting screw 172, the web 168, and the pad 170.

The focus adjustment is accomplished by means of a circular cam 194 lobe disposed in the space in between the objective lens mount 180 and the condensing lens mount 182. One end of a focus shaft 196 is secured to a side of the cam 194 at a location other than the geometric center such that the cam 194 may rotate in an eccentric manner. The focus shaft 196 is rotatably mounted in and supported by suitable bearings (not shown). The shaft 196 extends from the cam 194 thru the front panel 12 and terminates with the focus control 20. Rotation of the focus control 20 will cause rotation of the cam 194.

One end of the leaf spring 200 is secured to the condensing lens mount 182 by threaded fasteners 202. Other fastening means, such as ultra sonic staking, may be utilized to secure the leaf spring 200 to the lens mount 182. The distal end of the spring 200 bears against the cam 194. The leaf spring 200 is so located that a bending moment is established in the spring 200 when the cam 194 is installed. This bending moment forces the distal end of the leaf spring 200 against the cam 194 and concurrently develops a reaction force transmitted through the lens carrier 158 which continuously urges the surface 198 against the cam 194. The width of the spring 200, as well as the surface 198, is such that the focus adjustment can occur when the lens carrier 158 is at its first position or at its second position. Rotation of the focus control 20 causes the curvelinear surface of the cam 194 to axially displace the lens carrier 158 along the shaft 138.

The positioning of the cam 194, the leaf spring 200, and the cam following surface 198 is such that the focus adjustment is stable. Since the lens carrier 158 is free to move axially along the shaft 138, the force at the distal end of the leaf spring 200 and the cam 194 is balanced by the reaction force at the surface 198 and the other side of the cam 194. There is little tendency for the focus adjustment to "motor" or "creep" out of focus. In some spring loaded cam arrangements the forces presented at the curved surface of the eccentrically mounted cam by the spring biasing means can cause a resultant torque which will cause the cam to "motor" or "creep" from the desired setting. In the preferred embodiment this problem is overcome. The cam following surface 198 is always tangential to the cam 194 and the distal end of the leaf spring 200 substantially tangential to the cam 194 for the range of focus adjustment. The line of the leaf spring 200 force is substantially coincident with the line of the reaction force of the cam following surface 198. Little, if any, resultant torque is generate which could cause the focus adjustment to "motor" or "creep" out of adjustment.

The focus adjustment can be accomplished without the perceptible presence of backlash. The distal end of the leaf spring 200 causes the surface 198 to be continuously urged against the cam 194 to thereby compensate for any dimensional change of the parts. Such dimensional change may arise from thermal expansion or contraction, and surface wear. Minute changes in focus, including a series of focus control 20 reversals of diminishing magnitude can be made by the operator without having to manually compensate for backlash.

The only sources of backlash in the focusing system are the clearances between the focus shaft 196 and its support bearings. The clearance between the focus shaft 196 and its bearings can be reduced to an imperceptible level with inexpensive dimensionally standarized bearings and shafts.

As will be apparent to those skilled in the art, various changes and modifications may be made to the preferred embodiment described without departing from the scope of the present invention as defined by the appended claims.

I claim:

1. Projector elements for an image projector enabling selective projection of an image to a remote viewing screen or a local viewing screen comprising:
   image projection means mounted on support means for projecting an image along an axis aligned in a horizontal direction;
   a shaft rotatably mounted on said support means and rotatable to a first shaft position and a second shaft position about an axis substantially parallel to said projection axis;
   a lens carrier mounted on said shaft for rotation therewith and carrying a first objective lens in alignment with a first condensing lens and a second objective lens in alignment with a second condensing lens;
   a mirror moveably mounted on said support means and moveable to a first mirror position and a second mirror position about a substantially vertical axis; and
   link means coupling said mirror with said shaft whereby movement of said mirror move said link means which in turn rotates said shaft;
   said mirror moveable to said first mirror position wherein said mirror intercepts said image axis to reflect said image in a direction substantially perpendicular to said horizontal projection axis, movement of said mirror to said first position moving said link means to in turn rotate said shaft to said first shaft position placing said first objective lens and said first condensing lens in said image axis,
   said mirror moveable to said second mirror position wherein said mirror does not intercept said image axis, movement of said mirror to said second position moving said link means to in turn rotate said shaft to said second shaft position placing said second objective lens and said second condensing lens in said image axis.

2. The elements claimed in claim 1, wherein said image projector further comprises:
   a film transport means including a film track having an aperture formed therein for supporting film in said aperture;
   said aperture located around said horizontal image axis; and
   an illumination source for projecting light along said image axis.

3. The elements claimed in claim 2, further comprising:
   a rotatable sprocket mounted adjacent said film transport and engageable with said film in said track;
   whereby rotation of said sprocket causes said film to move past said aperture.

4. The elements claimed in claim 3, further comprising:
   a film containing cartridge detachably attachable to a first end of said film track; and
   a chamber at the other end of said film track for accumulating said film.

5. The elements claimed in claim 1, wherein said link means coupling said mirror with said shaft is an adjustable link means.

6. The elements claimed in claim 1, wherein said link means coupling said mirror with said shaft further comprises:
   a lost motion link having a slot formed therein;
   said lost motion link connected to said mirror;
   an arm secured to said shaft for rotation therewith and extending outward from said shaft thru said slot;
   whereby movement of said mirror causes rotation of said shaft.

7. The elements claimed in claim 6, wherein said lost motion link includes means to adjust the dimension of said slot.

8. The elements claimed in claim 1, wherein said first objective lens and said second objective lens have different focal lengths and are mounted in different planes in said lens carrier.

9. The elements claimed in claim 8 wherein said first objective lens and said first condensing lens are matched to provide optimum illumination efficiency; and said second objective lens and said second condensing lens are matched to provide optimum illumination efficiency.

10. The elements claimed in claim 1, further comprising:
 a fork secured to said shaft for rotation therewith having spaced tines extending outward therefrom;
 a web integrally formed with said lens carrier; and
 each tine embracing either side of said web
 whereby rotation of said shaft causes said fork to cause said lens carrier to rotate with said shaft.

* * * * *